(12) United States Patent
Dyer et al.

(10) Patent No.: US 6,365,642 B1
(45) Date of Patent: Apr. 2, 2002

(54) RAPID PREPARATION OF FOAM MATERIALS FROM HIGH INTERNAL PHASE EMULSIONS

(75) Inventors: John Collins Dyer; Robert Joseph McChain, both of Cincinnati; Yan Zhao, Hamilton, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/970,103

(22) Filed: Oct. 3, 2001

Related U.S. Application Data

(60) Provisional application No. 60/238,990, filed on Oct. 10, 2000.

(51) Int. Cl.$^7$ .................................................. C08J 9/28
(52) U.S. Cl. ......................................... 521/64; 521/63
(58) Field of Search ....................................... 521/64, 63

(56) References Cited

U.S. PATENT DOCUMENTS

| | | | |
|---|---|---|---|
| 5,189,070 A | 2/1993 | Brownscombe et al. | |
| 5,250,576 A | * 10/1993 | DesMarais et al. | ........... 521/64 |
| 5,252,619 A | 10/1993 | Brownscombe et al. | |
| 5,290,820 A | 3/1994 | Brownscombe et al. | |
| 5,563,179 A | 10/1996 | Stone et al. | |
| 5,849,805 A | * 12/1998 | Dyer | ........... 521/64 |
| 6,274,638 B1 | 8/2001 | Yonemura et al. | |

FOREIGN PATENT DOCUMENTS

| | | |
|---|---|---|
| WO | WO 00/50498 | 8/2000 |
| WO | WO 00/127164 | 4/2001 |
| WO | WO 00/136492 | 5/2001 |
| WO | WO 00/136493 | 5/2001 |
| WO | WO 00/138404 | 5/2001 |

* cited by examiner

Primary Examiner—Morton Foelak
(74) Attorney, Agent, or Firm—Angela Marie Stone; Edward J. Milbrada

(57) ABSTRACT

This application relates to flexible, microporous, open-celled polymeric foam materials with physical characteristics that make them suitable for a variety of uses. This application particularly relates to monomer compositions having short curing times for preparing such foam materials from high internal phase emulsions.

15 Claims, 1 Drawing Sheet

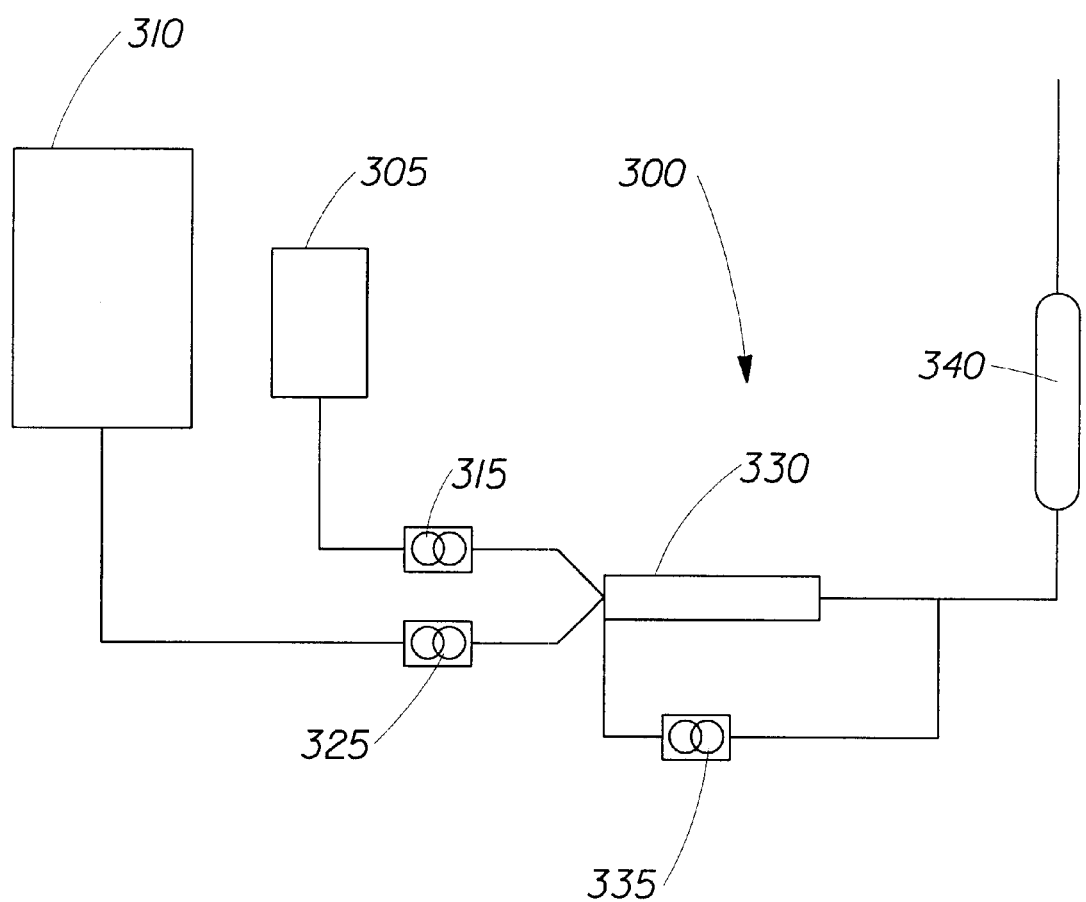

RAPID PREPARATION OF FOAM MATERIALS FROM HIGH INTERNAL PHASE EMULSIONS

CROSS REFERENCE TO RELATED APPLICATION

This application claims benefit and priority to provisional application 60/238,990 filed Oct. 10, 2000.

FIELD OF THE INVENTION

This application relates to rapid curing of high internal phase emulsions to produce microporous, open-celled polymeric foam materials with physical characteristics that make them suitable for a variety of uses.

BACKGROUND OF THE INVENTION

The development of microporous foams is the subject of substantial commercial interest. Such foams have found utility in various applications, such as thermal, acoustic, electrical, and mechanical (e.g., for cushioning or packaging) insulators; absorbent materials; filters; membranes; floor mats; toys; carriers for inks, dyes, lubricants, and lotions; and the like. References describing such uses and properties of foams include Oertel, G., "Polyurethane Handbook"; Hanser Publishers: Munich, 1985, and Gibson, L. J.; Ashby, M. F., "Cellular Solids. Structure and Properties"; Pergamon Press: Oxford, 1988. The term "insulator" refers to any material which reduces the transfer of energy from one location to another. The term "absorbent" refers to materials which imbibe and hold or distribute fluids, usually liquids, an example being a sponge. The term "filter" refers to materials which pass a fluid, either gas or liquid, while retaining impurities within the material by size exclusion, interception, electrostatic attraction, adsorption, etc. Other uses for foams are generally obvious to one skilled in the art.

Open-celled foams prepared from High Internal Phase Emulsions (hereinafter referred to as "HIPEs") are particularly useful in a variety of applications including absorbent disposable articles (U.S. Pat. No. 5,331,015 (DesMarais et al.) issued Jul. 19, 1994, U.S. Pat. No. 5,260,345 (DesMarais et al.) issued Nov. 9, 1993, U.S. Pat. No. 5,268,224 (DesMarais et al.) issued Dec. 7, 1993, U.S. Pat. No. 5,632,737 (Stone et al.) issued May 27, 1997, U.S. Pat. No. 5,387,207 (Dyer et al.) issued Feb. 7, 1995, U.S. Pat. No. 5,786,395 (Stone et al.) Jul. 28, 1998, U.S. Pat. No. 5,795,921 (Dyer et al.) issued Aug. 18, 1998), insulation (thermal, acoustic, mechanical) (U.S. Pat. No. 5,770,634 (Dyer et al.) issued Jun. 23, 1998, U.S. Pat. No. 5,753,359 (Dyer et al.) issued May 19, 1998, and U.S. Pat. No. 5,633,291 (Dyer et al.) issued May 27, 1997), filtration (Bhumgara, Z. *Filtration & Separation* March 1995, 245–251; Walsh et al. *J Aerosol Sci.* 1996, 27, 5629–5630; published PCT application W/O97/37745, published on Oct. 16, 1997, in the name of Shell Oil Co.), and various other uses. The cited patents and references above are incorporated herein by reference. The HIPE process provides facile control over the density, cell and pore size and distribution, proportion of cell struts to windows, and porosity in these foams.

Economics is an important issue in making HIPE foams commercially attractive. The economics of HIPE foam production depends on the amount and cost of the monomers used per unit volume of the foam, as well as the cost of converting the monomers to a usable polymeric foam (process costs). Making HIPE foams economically attractive can require minimizing one or more of: (1) the total monomer per unit volume of foam, (2) expense of the monomers, (3) the expense of the process for converting these monomers to a usable HIPE foam, or (4) combinations of these factors. The monomer formulation and process conditions must be such that the properties of the HIPE foam meet the requirements for the particular application.

The physical properties of the foam are governed by: (1) the properties of the polymer comprising the foam, (2) the density of the foam, (3) the structure of the foam (i.e. the thickness, shape and aspect ratio of the polymer struts that define the foam cells, cell size, pore size, pore size distribution, etc.), and (4) the surface properties of the foam (e.g., whether the surface of the foam is hydrophilic or hydrophobic). Once the requirements for a particular application are known and achieved, an economically attractive process for preparing the material is desired. A key aspect of this process is the rate of polymerization and crosslinking, together referred to as curing, of the oil phase of a HIPE to form a crosslinked polymer network. Previously, this curing step required that the emulsion be held at an elevated temperature (40° C.–82° C.) for a relatively long period of time (typically from 2 hours to 18 hours or longer) or the use of pressurized curing (to enable temperatures in excess of 100° C.). Such long cure times and/or pressurized reactors can necessitate relatively low throughput rates and resulting higher capital and production costs.

Previous efforts to devise commercially successful schemes for producing HIPE foams have involved, for example, pouring the HIPE into a large holding vessel which is then placed in a heated area for curing. See for example U.S. Pat. No. 5,250,576 (DesMarais et al.) issued Oct. 5, 1993. U.S. Pat. No. 5,189,070 (Brownscombe et al), issued Feb. 23, 1993; 5,290,820 (Brownscombe et al.) issued Mar. 1, 1994; and 5,252,619 (Brownscombe, et al.) issued Oct. 12, 1993 disclose curing the HIPE in multiple stages. The first stage is conducted at a temperature of less than about 65° C. until the foam reaches a partial state of cure. Then the temperature is increased to between 70° C. and 175° C. to effect rapid final curing. The whole process takes about 3 hours. Another scheme to produce HIPE foams envisaged placing the emulsion on a layer of impermeable film which would then be coiled and placed in a curing chamber (U.S. Pat. No. 5,670,101 (Nathoo, et al.) issued Sep. 23, 1997). The coiled film/emulsion sandwich could then be cured using the sequential temperature sequence disclosed in the Brownscombe, et al patents discussed above. U.S. Pat. No. 5,849,805 issued in the name of Dyer on Dec. 15, 1998 discloses forming the HIPE at a temperature of 82° C. (pour temperature in Example 2) and curing the HIPE at 82° C. for 2 hours. However, none of these approaches offer the combination of very fast conversion (e.g., in minutes or seconds) from HIPE to polymeric foam that would provide for a relatively simple, low capital process for producing HIPE foams both economically and with the desired set of properties. PCT application Serial No. W/O 00/50498, published in the name of DesMarais, et al. on Aug. 31, 2000 describes a process for curing a continuous strip of HIPE into the resulting foam and an inclined tube apparatus for curing HIPE under pressure conferred by the hydrostatic pressure of the emulsion to facilitate rapid curing at elevated temperatures. U.S. Pat. No. 6,274,638 (Yonemura et al.) issued Aug. 14, 2001 discloses a method for producing a HIPE foam in a short period of time by means either of using an active energy ray or by raising the temperature of the HIPE after curing in a continuous process.

The art also discloses using pressure to control the volatility of monomers that, otherwise, would boil off at a suitable polymerization/curing temperature. For example, commonly assigned U.S. Pat. No. 5,767,168, issued to Dyer, et al. on Jun. 16, 1998, discloses the suitability of pressurization to control the volatility of relatively volatile conjugated diene monomers. However, the cure time for the foams disclosed therein is still greater than two hours so there is still substantial opportunity for substantial improvement in curing rate that would improve the economic attractiveness of HIPE foams.

Accordingly, it would be desirable to develop a rapid and efficient process for preparing open-celled polymeric HIPE foam materials with the desired properties without resorting to complex assemblies for containing high pressure needed to cure HIPE at temperatures in excess of the boiling point of water or by adding procedures subsequent to the initial curing process or by adding other complex curing steps such as those comprising e-beam rays, for example.

SUMMARY OF THE INVENTION

The present invention relates to a method for obtaining open-celled foams by polymerizing a High Internal Phase Emulsion, or HIPE, which has a relatively small amount of a continuous oil phase and a relatively greater amount of a discontinuous aqueous phase. In particular, the present invention relates to use of more reactive monomers to enable fast curing while also achieving the required physical properties of the foams. The present invention further describes specific initiator systems and levels and curing temperatures which can significantly reduce the time needed to cure the HIPE. This acceleration in curing can significantly reduce capital needs in both batchwise and continuous production of cured HIPE foams while also providing HIPE foams having useful properties comparable to those of foams made with much lengthier or more complex curing processes described in the art.

The process for the preparation of a polymeric foam material of the present invention generally comprises the steps of: A) forming a water-in-oil emulsion from 1) an oil phase comprising specific polymerizable monomers and 2) a water phase comprising an aqueous solution containing from about 0.2 to about 40% of a water-soluble electrolyte; and B) curing the monomer component in the oil phase of the water-in-oil emulsion using a polymerization reaction. The polymerization reaction is conducted at a curing temperature of from about 20° C. to about 130° C. to form a saturated polymeric foam material. The water-in-oil emulsion will have a volume to weight ratio of water phase to oil phase in the range of from about 8:1 to about 140:1. The oil phase comprises: a) from about 80 to about 99% of a monomer component capable of rapid curing and b) from about 1 to about 20% of an emulsifier component which is soluble in the oil phase and suitable for forming a stable water-in-oil emulsion. Specifically, the monomer component comprises: i) from about 20% to about 97% by weight of a substantially water-insoluble monomer selected from the group consisting of alkyl acrylates, alkyl methacrylates, and mixtures thereof; ii) from about 2% to about 40% of a substantially water-insoluble polyfunctional crosslinker selected from the group consisting of acrylates, methacrylate polyesters, and mixtures thereof; and iii) from about 0 to about 15% of a third substantially water-insoluble monomer. The aqueous phase may also comprise an effective amount of a polymerization initiator system. If desired, after polymerization, the aqueous fraction of the HIPE foam may be removed and the moist foam dried by a variety of techniques to yield the open-celled, microporous, low density product.

The curing of HIPEs in a relatively short time period allows increased production and improved economics relative to previously described methods. Either batch or continuous processes for producing the HIPE can be used.

BRIEF DESCRIPTION OF THE DRAWINGS

FIG. 1 is a schematic diagram of a continuous process for preparing HIPE foams

DETAILED DESCRIPTION OF THE INVENTION

I. Definitions

The following definitions are offered relative to the current invention.

"Curing" is the process of converting a HIPE to a HIPE foam. Curing involves the polymerization of monomers into polymers. A further step included in the curing process is crosslinking. A cured HIPE foam is one which has the physical properties, e.g., mechanical integrity, to be handled in subsequent processing steps (which may include a post-curing treatment to confer the final properties desired). Generally, curing is effected via the application of heat. An indication of the extent of cure is the mechanical strength of the foam, as measured by yield stress using the method described in the Test Methods section below "Polymerization" is the part of the curing process whereby the monomers of the oil phase are converted to a relatively high molecular weight polymer.

"Crosslinking" is the part of the curing process whereby monomers having more than one functional group with respect to free radical polymerization are copolymerized into more than one chain of the growing polymer.

A "batch" process for producing HIPE foam generally involves collecting the HIPE in a specific container in which the HIPE is cured. "Batch" would include processes wherein multiple small containers of relatively sophisticated shapes are used to collect the HIPE. Such shaped vessels can provide for "molded" shapes having three-dimensional features. A "continuous" process for producing HIPE foam generally involves collecting the HIPE on a moving web or within a pipe or tube or manifold which may pass through a heating zone and produce a continuous element of cured HIPE foam of varied shape and cross-section.

The term "alkyl" as used herein includes organic moieties such as methyl, ethyl, n-propyl, and the like well known in organic chemistry. The term is also intended to encompass the more restrictive "aryl" class which is not normally included in the "alkyl" nomenclature. Hence, "alkyl" as used herein is understood to include "aryl" groups such as phenyl, naphthyl, and mixed groups such as benzyl. This generalization is intended to simplify the descriptions of the invention. Similarly, the term "methacrylate" as used herein includes such moieties as "ethacrylate" and higher derivatives. Such groups are far less common in practice and have apparently no current commercial use and are not specifically described hereinafter.

I. Polymeric Foam Derived From a High Internal Phase Emulsion

A. General Foam Characteristics

1. Oil Phase Components

The oil phase of the HIPE comprises monomers that are polymerized to form the solid foam structure and the emulsifier necessary to stabilize the emulsion. The monomer component, which is capable of rapid curing, is present in an amount of from about 80% to about 99% and preferably from about 85% to about 95% by weight. The emulsifier component, which is soluble in the oil phase and suitable for forming a stable water-in-oil emulsion, is present in an amount of from about 1% to about 20% by weight. The emulsion is formed at an emulsification temperature of from about 20° C. to about 130° C. and preferably from about 70° C. to about 100° C.

In general, the monomers will include from about 20 to about 97% by weight of at least one substantially water-insoluble monofunctional alkyl acrylate or alkyl methacrylate. Exemplary monomers of this type include $C_4$–$C_{18}$ alkyl acrylates and $C_2$–$C_{18}$ methacrylates. Preferred monomers of this type include 2-ethylhexyl acrylate, n-butyl acrylate, n-hexyl acrylate, n-octyl acrylate, n-nonyl acrylate, n-decyl acrylate, isodecyl acrylate, n-tetradecyl acrylate, benzyl acrylate, nonyl phenyl acrylate, n-hexyl methacrylate, 2-ethylhexyl methacrylate, n-octyl methacrylate, n-nonyl methacrylate, n-decyl methacrylate, isodecyl methacrylate, n-dodecyl methacrylate, n-tetradecyl methacrylate, and n-octadecyl methacrylate. Appropriate blends of these monomers can provide the desired Tg of the resulting HIPE foams and will generally comprise 20% to about 97%, more preferably 45% to about 85%, by weight of the monomer component. The preferred monomers of this group are 2-ethylhexyl acrylate (EHA) and 2-ethylhexyl methacrylate (EHMA).

The oil phase will also comprise from about 2 to about 40%, preferably from about 10 to about 30%, by weight of a substantially water-insoluble, polyfunctional crosslinking alkyl acrylate or methacrylate. This crosslinking comonomer, or crosslinker, is added to confer strength and resilience to the resulting HIPE foam. Exemplary crosslinking monomers of this type comprise monomers containing two or more activated acrylate and/or methacrylate groups. These generally are the result of condensation reaction of acrylic acid or methacrylic acid with polyfunctional alcohols. Nonlimiting examples of this group include 1,6-hexanedioldiacrylate, 1,4-butanedioldimethacrylate, trimethylolpropane triacrylate, trimethylolpropane trimethacrylate, 1,1 2-dodecyldimethacrylate, 1,14-tetradecanedioldimethacrylate, ethylene glycol dimethacrylate, neopentyl glycol diacrylate (more correctly termed "2,2-dimethylpropanediol diacrylate"), hexanediol acrylate methacrylate, glucose pentaacrylate, sorbitan pentaacrylate, and the like. Such di-, tri-, tetra-, and higher acrylates and methacrylates as provided by suppliers often contain impurities such as incompletely esterified alcohols that may be inimical to emulsion formation and stability. It can be useful, as detailed hereinafter, to remove these alcohols at least partially to improve emulsion stability and formation quality of the resulting HIPE foams. Other preferred crosslinkers contain a mixture of acrylate and methacrylate moieties. Such crosslinkers are believed to be effective when blends of alkyl acrylate and methacrylate monomers are employed in ensuring homogeneous crosslinkering in the resulting polymer. Nonlimiting examples include ethylene glycol acrylate-methacrylate and neopentyl glycol acrylate-methacrylate. Such mixed crosslinkers may be prepared either by esterification with a mixture of methacrylic acid and acrylic acid combined with the corresponding diol or triol or by first make the acrylate or methacrylate monofunctionality with a free alcohol which is then esterified with the other acid, either methacrylic acid or acrylic acid, or by any other means. The ratio of methacrylate:acrylate group in the mixed crosslinker may be varied from 50:50 to any other ratio as needed in the given instant. The most preferred crosslinker of this group is found to be ethylene glycol dimethacrylate (EGDMA), though this preference is predicated on the kinds of end properties desired in the resulting HIPE foam.

Any third substantially water-insoluble comonomer may be added to the oil phase in weight percentages of from about 0% to about 15%, preferably from about 2% to about 8%, to modify properties in other ways. In certain cases, "toughening" monomers may be desired which impart toughness to the resulting HIPE. These include monomers such as styrene, vinyl chloride, vinylidene chloride, isoprene, and chloroprene. Without being bound by theory, it is believed that such monomers aid in stabilizing the HIPE during curing to provide a more homogeneous and better formed HIPE foam which results in better toughness, tensile strength, abrasion resistance, etc. Monomers may also be added to confer flame retardancy as disclosed in U.S. Pat. No. 6,160,028 (Dyer) issued Dec. 12, 2000. Monomers may be added to confer color (e.g., vinyl ferrocene), fluorescent properties, radiation resistance, opacity to radiation (e.g., lead tetraacrylate), to disperse charge, to reflect incident infrared light, to absorb radio waves, to form a wettable surface on the HIPE foam struts, or for any other purpose. In some cases, these additional monomers may slow the overall process of conversion of HIPE to HIPE foam, the tradeoff being necessary if the desired property is to be conferred. Thus, it is desired generally to minimize the amount of such monomers to keep the slowing of the rate of conversion to a minimum, or to exclude these types unless needed. The preferred monomers of this type comprise styrene and vinyl chloride. Styrene in particular is useful in providing a resulting HIPE foam with improved tensile toughness even when used at a modest level of 1% to 15%. Even higher levels of styrene may be employed as needed thought the effect on reaction kinetics gradually becomes limiting.

The oil phase will further contain an effective amount of emulsifier necessary for stabilizing the HIPE. Such emulsifiers are generally well known to those skilled in the art and examples are provided infra.

The oil phase may also contain an oil soluble initiator such a benzoyl peroxide, di-t-butyl peroxide, lauroyl peroxide, azoisobutyronitrile, 2,2'-azobis(2,4-dimethylvaleronitrile), 2,2'-azobisisobutyronitrile, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, alpha-cumyl peroxyneodecanoate, alpha-cumyl peroxyneodecanoate, t-amyl peroxyneodecanoate, t-butyl peroxyneodecanoate, t-amyl peroxypivalate, t-butyl peroxypivalate, 2,5-dimethyl 2,5-di(2-ethylhexanoylperoxy)hexane, t-amyl peroxy-2-ethylhexanoate, t-butyl peroxy-2-ethylhexanoate, t-butyl peroxyacetate, t-amyl peroxyacetate, t-butyl perbenzoate, t-amyl perbenzoate, dicumyl peroxide, 2,5-dimethyl-2,5-di-(t-butylperoxy)hexane, di-t-butyl peroxide, di-t-amyl peroxide, cumeme hydroperoxide, t-butyl hydroperoxide, t-amyl hydroperoxide, 1,1-di-(t-butylperoxy)-3,3,5-trimethylcyclohexane, 1,1-di-(t-butylperoxy)cyclohexane, 1,1-di-(t-amylperoxy)cyclohexane, ethyl 3,3-di-(t-butylperoxy)butyrate, ethyl 3,3-di-(t-amylperoxy)butyrate, and other such initiators known to those skilled in the art. Since the rate of curing of these HIPEs is generally quite fast, it can be preferred that their addition to the monomer phase be just after (or near the end of) emulsification to reduce the potential for premature polymerization which may clog the emulsification system. Other sources of free radicals with which to effect polymerization and curing are contemplated and are well known to those skilled in the art. These include exposure to high energy photons such as UV (often used with specific compounds such as benzophenone to provide radicals), gamma, X-ray, electron beams, and any other such energetic means of providing free radicals. Generally these techniques are less preferred as they produce generally weaker cured HIPE foams.

2. Aqueous Phase Components

The discontinuous aqueous (or water) internal phase of the HIPE is generally one or more aqueous solutions containing one or more dissolved components. One essential dissolved component of the aqueous phase is a water-soluble electrolyte. The water phase will contain from about 0.2% to about 40%, preferably from about 2% to about 20%, by weight of a water-soluble electrolyte. The dissolved electrolyte minimizes the tendency of monomers, comonomers, and crosslinkers that are primarily oil soluble to also dissolve in the aqueous phase. Preferred electrolytes include chlorides or sulfates of alkaline earth metals such as calcium or magnesium. Such electrolyte can include a buffering agent for the control of pH during the polymerization, including such inorganic counterions as phosphate, borate, and carbonate, and mixtures thereof, for example. Small amounts of water soluble monomers may also be employed, examples being acrylic acid and vinyl acetate.

Another optional component of the aqueous phase is a water-soluble free-radical initiator as may be known to the art. The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, and other azo initiators of this type. Again, as the rate of polymerization is fast with these systems, it can be desirable to provide the initiator to the formed or partially formed emulsion rather than as part of the starting aqueous phase so as to reduce the amount of premature polymerization that takes place in the emulsification system.

Yet another optional component is a potentiator of the initiator, including salts comprising the sulfite moiety. A preferred example is sodium hydrosulfite ($NaHSO_3$). Other examples include inorganic salts of reduced transition metals such as Fe(ll) sulfate and the like. Other adjuvants include tetraalkyl ammonium salts such as tetra-n-butyl ammonium chloride. Such salts may function as Phase Transfer Catalysts (PTCs) (as described in Starks, C. M. and Liotta, C., "Phase Transfer Catalysis. Principles and Techniques.", Academic Press, New York, 1978) to potentiate the transfer of the inorganic initiating specie into the oil/monomer phase for more rapid polymerization. Such potentiating species may be added at a point separate from that of the initiator, either before or after, to aid in limiting premature polymerization.

3. Emulsifier

The emulsifier is necessary for forming and stabilizing the HIPE. The emulsifier is generally included in the oil phase and tends to be relatively hydrophobic in character. (See for example Williams, J. M., Langmuir 1991, 7, 1370–1377, incorporated herein by reference.) For preferred HIPEs that are polymerized to make polymeric foams, suitable emulsifiers can include sorbitan monoesters of branched $C_{16}$–$C_{24}$ fatty acids, linear unsaturated $C_{16}$–$C_{22}$ fatty acids, and linear saturated $C_{12}$–$C_{14}$ fatty acids, such as sorbitan monooleate, sorbitan monomyristate, and sorbitan monoesters derived from coconut fatty acids. Exemplary emulsifiers include sorbitan monolaurate (e.g., SPAN® 20, preferably greater than about 40%, more preferably greater than about 50%, most preferably greater than about 70% sorbitan monolaurate), sorbitan monooleate (e.g., SPAN® 80, preferably greater than about 40%, more preferably greater than about 50%, most preferably greater than about 70% sorbitan monooleate), diglycerol monooleate (e.g., preferably greater than about 40%, more preferably greater than about 50%, most preferably greater than about 70% diglycerol monooleate, or "DGMO"), diglycerol monoisostearate (e.g., preferably greater than about 40%, more preferably greater than about 50%, most preferably greater than about 70% diglycerol monoisostearate, or "DGMIS"), and diglycerol monomyristate (e.g., preferably greater than about 40%, more preferably greater than about 50%, most preferably greater than about 70% sorbitan monomyristate, or "DGMM"). These diglycerol monoesters of branched $C_{16}$–$C_{24}$ fatty acids, linear unsaturated $C_{16}$–$C_{22}$ fatty acids, or linear saturated $C_{12}$–$C_{14}$ fatty acids, such as diglycerol monooleate (i.e., diglycerol monoesters of C18:1 fatty acids), diglycerol monomyristate, diglycerol monoisostearate, and diglycerol monoesters of coconut fatty acids; diglycerol monoaliphatic ethers of branched $C_{16}$–$C_{24}$ alcohols (e.g. Guerbet alcohols), linear unsaturated $C_{16}$–$C_{22}$ alcohols, and linear saturated $C_{12}$–$C_{14}$ alcohols (e.g., coconut fatty alcohols), and mixtures of these emulsifiers are particularly useful. See U.S. Pat. No. 5,287,207 (Dyer et al.), issued Feb. 7, 1995 (herein incorporated by reference) which describes the composition and preparation suitable polyglycerol ester emulsifiers and U.S. Pat. No. 5,500,451 (Goldman et al.) issued Mar. 19, 1996 (incorporated by reference herein), which describes the composition and preparation suitable polyglycerol ether emulsifiers. These generally may be prepared via the reaction of an alkyl glycidyl ether with a polyol such as glycerol. Particularly preferred alkyl groups in the glycidyl ether include isostearyl, hexadecyl, oleyl, stearyl, and other $C_{16}$–$C_{18}$ moieties, branched and linear. (The product formed using isodecyl glycidyl ether is termed "IDE" hereinafter and that formed using hexadecyl glycidyl ether is termed "HDE" hereinafter.) Another general class of preferred emulsifiers is described in U.S. Pat. No. 6,207,724 (Hird et al.) issued Mar. 27, 2001. Such emulsifiers comprise a composition made by reacting a hydrocarbyl substituted succinic acid or anhydride or a reactive equivalent thereof with either a polyol (or blend of polyols), a polyamine (or blend of polyamines) an alkanolamine (or blend of alkanol amines), or a blend of two or more polyols, polyamines and alkanolamines. One effective emulsifier of this class is polyglycerol succinate (PGS), which is formed from an alkyl succinate and glycerol and triglycerol. Many of the above emulsifiers are mixtures of various polyol functionalities which are not completely described in the nomenclature. Those skilled in the art recognize that "diglycerol", for example, is not a single compound as not all of this is formed by "head-to-tail" etherification in the process.

Such emulsifiers and blends thereof are typically added to the oil phase so that they comprise between about 1% and about 20%, preferably from about 2% to about 15%, and more preferably from about 3% to about 12% thereof. For the current application, emulsifiers that are particularly able to stabilize HIPEs at high temperatures are preferred. Coemulsifiers may also be used to provide additional control of cell size, cell size distribution, and emulsion stability, particularly at higher temperatures (e.g., greater than about 65° C.). Exemplary coemulsifiers include phosphatidyl cholines and phosphatidyl choline-containing compositions, aliphatic betaines, long chain $C_{12}$–$C_{22}$ dialiphatic, short chain $C_1$–$C_4$ dialiphatic quaternary ammonium salts, long chain $C_{12}$–$C_{22}$ dialkoyl(alkenoyl)-2-hydroxyethyl, short chain $C_1$–$C_4$ dialiphatic quaternary ammonium salts, long chain $C_{12}$–$C_{22}$ dialiphatic imidazolinium quaternary ammonium salts, short chain $C_1$–$C_4$ dialiphatic, long chain $C_{12}$–$C_{22}$ monoaliphatic benzyl quaternary ammonium salts, the long chain $C_{12}$–$C_{22}$ dialkoyl(alkenoyl)-2-aminoethyl, short chain $C_1$–$C_4$ monoaliphatic, short chain $C_1$–$C_4$ monohydroxyaliphatic quaternary ammonium salts Particularly preferred is ditallow dimethyl ammonium methyl sulfate (DTDMAMS). Such coemulsifiers and additional examples are described in greater detail in U.S. Pat. No. 5,650,222, issued in the name of DesMarais, et al. on Jul. 22, 1997, the disclosure of which is incorporated herein by reference. Exemplary emulsifier systems comprise 6% PGS and 1% DTDMAMS or 5% IDE and 0.5% DTDMAMS. The former is found useful is forming smaller celled HIPEs and the latter tends to stabilize larger celled HIPEs. Higher levels of any of these components may be needed for stabilizing HIPEs with higher W:O ratios, e.g., those exceeding about 35:1.

4. Optional Ingredients

Various optional ingredients may also be included in either the water or oil phase for various reasons. Examples include antioxidants (e.g., hindered phenolics, hindered amine light stabilizers, UV absorbers), plasticizers (e.g., dioctyl phthalate, dinonyl sebacate), flame retardants (e.g., halogenated hydrocarbons, phosphates, borates, inorganic salts such as antimony trioxide or ammonium phosphate or magnesium hydroxide), dyes and pigments, fluorescers, filler particles (e.g., starch, titanium dioxide, carbon black, or calcium carbonate), fibers, chain transfer agents, odor absorbers such as activated carbon particulates, dissolved polymers and oliogomers, and such other agents as are commonly added to polymers for a variety of reasons. Such additives may be added to confer color, fluorescent properties, radiation resistance, opacity to radiation (e.g., lead compounds), to disperse charge, to reflect incident infrared light, to absorb radio waves, to form a wettable surface on the HIPE foam struts, or for any other purpose.

B. Processing Conditions for Obtaining HIPE Foams

Foam preparation typically involves the steps of: 1) forming a HIPE; 2) curing the HIPE under conditions suitable for forming an open-celled cellular polymeric structure; 3) optionally squeezing and washing the cellular polymeric structure to remove the original residual water phase from the polymeric foam structure and, if necessary, treating the polymeric foam structure with a hydrophilizing surfactant and/or hydratable salt to deposit any needed hydrophilizing surfactant/hydratable salt, and 4) thereafter dewatering this polymeric foam structure.

1. Formation of HIPE

The HIPE is formed by combining the water and oil phase components in a ratio between about 8:1 and 140:1. This is termed the "water-to-oil" or W:O ratio and is significant as it is the primary determinant of the density of the resulting dried HIPE foam. Preferably, the ratio is between about 10:1 and about 75:1, more preferably between about 13:1 and about 65:1. An exemplary W:O ratio is about 35:1. (The ratio is generally expressed as volume of aqueous phase to weight of organic phase.) As discussed above, the oil phase will typically contain the requisite monomers, comonomers, crosslinkers, and emulsifiers, as well as optional components. The water phase will typically contain electrolyte or electrolytes and polymerization initiator or initiators.

The HIPE can be formed from the combined oil and water phases by subjecting these combined phases to shear agitation. Shear agitation is generally applied to the extent and for a time period necessary to form a stable emulsion having aqueous droplets of the size desired. Such a process can be conducted in either batchwise or continuous fashion and is generally carried out under conditions suitable for forming an emulsion where the aqueous phase droplets are dispersed to such an extent that the resulting polymeric foam will have the requisite structural characteristics. Emulsification of the oil and water phase combination may involve the use of a mixing or agitation device such as an impeller. Alternatively, the mixing may be effected by passing the combined oil and water phases through a series of static mixers at a rate necessary to impart the requisite shear. In such a process, a liquid stream comprising the oil phase is formed. Concurrently, a separate larger liquid stream comprising the water phase is also formed. The two separate streams are provided to a suitable mixing chamber or zone at a suitable emulsification pressure and combined therein such that the requisite water to oil phase weight ratios previously specified are achieved.

In the mixing chamber or zone, the combined streams are generally subjected to shear agitation provided, for example, by an impeller of suitable configuration and dimensions, or by any other means of imparting shear or turbulent mixing generally known to those skilled in the art. Examples of such alternative means of providing shear include in-line mixers as are described in PCT application Serial No. W/O 01/27165, published in the name of Catalfamo et al. on Apr. 19, 2001.

Shear will typically be applied to the combined oil/water phase stream at an appropriate rate and extent. Once formed, the stable liquid HIPE can then be withdrawn or pumped from the mixing chamber or zone. One preferred method for forming HIPEs using a continuous process is described in greater detail in U.S. Pat. No. 5,149,720 (DesMarais et al), issued Sep. 22, 1992, which is incorporated by reference. See also commonly assigned U.S. Pat. No. 5,827,909 (DesMarais) issued on Oct. 27, 1998 (incorporated herein by reference), which describes an improved continuous process having a recirculation loop for the HIPE. The process also allows for the formation of two or more different kinds of HIPEs in the same vessel as disclosed in U.S. Pat. No. 5,817,704 (Shiveley et al.) issued Oct. 6, 1998, incorporated herein by reference. In this example, two or more pairs of oil and water streams may be independently mixed and then blended as required.

2. Polymerization/Curing of the oil phase of the HIPE

The present invention relates to polymerization/curing of the oil phase of the emulsion using selected monomers which provide for faster curing. The HIPE formed as described above may be polymerized/cured in a batch process or in a continuous process.

A measure of the extent of cure of the polymer is the strength of the foam, as measured by the yield stress described in the Test Methods section below. Another measure of the extent of cure of the polymer is the extent to which it swells in a good solvent such as toluene (being crosslinked, the HIPE foam does not dissolve without being chemically altered), also described in more detail in the Test Methods section below.

Without being bound by theory, it is believed that curing comprises two overlapping processes. These are the polymerization of the monomers and the formation of crosslinks between active sites on adjacent polymer backbones. Crosslinking is essential to the formation of HIPE foams with strength and integrity essential to their further handling and use. The current invention involves accelerating both steps by selection of more reactive monomers than have previously been employed.

Acrylate and methacrylate esters when used as the principle monomer component of the oil phase have been found to enhance the rate of polymerization of these monomers compared with the monomer systems described previously in the art. For example, a typical oil phase disclosed previously includes both styrenic (such as styrene and divinyl benzene) and alkyl acrylate portions. It has been found that the presence of a styrenic component can significantly retard the rate of polymerization and subsequent HIPE curing. Without being bound by theory, it is believed that this reflects the effect of the reactivity ratios of styrenic-alkyl acrylate (or methacrylate) copolymers which favor reaction of the styrenic monomers first in the copolymerization. However, the alkyl acrylates and methacrylates in neat form will polymerize faster than the styrenics in neat form (see Odian, G. "Principles of Polymerization"; $3^{rd}$ ed.; Wiley & Sons: New York, N.Y., p275, Table 3–11). In this citation, the rate of polymerization of methyl acrylate is more than 12× faster than that of styrene, and that for methyl methacrylate is more than 3× faster. Thus, the polymerization of an oil phase constituted primarily of alkyl acrylates (or alkyl methacrylates) would be expected to polymerize significantly faster than one containing significantly amounts of styrenic monomer. The substantial exclusion of styrenic monomers, however, incurs two primary challenges. First, styrenic monomers are exceptionally amenable to HIPE formation because of their hydrophobicity. Second, one of the most efficient crosslinkers known, divinyl benzene, is a styrenic monomer (crosslinker) and cannot be used to any great degree if the significant rate acceleration is to be achieved. Applicants have traversed these challenges in developing suitable formulations of acrylate and methacrylate monomers and crosslinkers which provide adequate HIPE stability, preferred properties in the resulting HIPE foams, and the significant increase in rate of polymerization.

In one embodiment of the present invention, the formed HIPE is collected in an individual vessel or molded shape using compatible materials and placed in a suitable curing oven, typically set at temperatures between about 20° C. and about 130° C. The curing temperature is commonly from about 80° C. to about 110° C. In a second embodiment, the HIPE is formed in a continuous process, as is shown schematically in FIG. 1. If the vessel is closed and adequately pressure resistant, the curing temperature can be increased beyond 100° C. as needed. Since higher temperature favors a faster overall curing rate, it will be preferred that the HIPE be formed at a higher temperature, e.g., above about 75° C., preferably above about 85° C., and most preferably at about 95° C. The temperature of the suitable curing over is most preferably the same as that (or slightly above that) of the forming HIPE.

FIG. 1 describes one method and an apparatus 300 suitable for continuously forming HIPE foams according to the present invention. A HIPE is made using the methods generally described in the aforementioned U.S. Pat. Nos. 5,149,720 and 5,827,909. That is, the oil phase (desired blend of monomers and emulsifier) is prepared and stored in an oil phase supply vessel 305. Similarly, the desired aqueous phase (blend of water, electrolyte and initiator) is prepared and stored in an aqueous phase supply vessel 310. The oil phase and the aqueous phase are supplied in the desired proportions to mixhead 330 by an oil phase supply pump 315 and an aqueous phase supply pump 325. The mixhead 330 supplies the mechanical energy (shear) necessary to form the HIPE. If desired, a HIPE recirculation pump 335 can be used.

The formed HIPE is pumped into an elongated curing chamber 340 with specific cross-sectional shape and dimensions as desired for the foam product. The oil phase supply pump 315 and the aqueous phase supply pump may be used to pump the HIPE from the mixhead 330 to the curing chamber 340. In this case, emulsification will occur at substantially the curing pressure.

In an alternative embodiment of the present invention (not shown), multiple systems, similar to those described above, can be used to make multiple HIPEs having different combinations of properties (e.g. pore dimensions, mechanical properties, etc.). Such multiple HIPEs can be introduced into the curing chamber 340 so as to provided a cured foam having regions of varying properties as may be desired for a particular end use.

The chamber 340 may further be lined with a material compatible with the HIPE so that it does not cause degradation of the HIPE structure at the interior surfaces which contact the HIPE, and is not degraded by the oil or water phase components at the elevated temperatures intended. This compatible material may comprise a continuously moving belt on which the curing HIPE is supported. Optionally, a slip layer may be provided between the curing HIPE and the chamber walls to minimize uneven flow patterns as the HIPE progresses through the chamber 340. As with the lining discussed above, the slip layer must be compatible with the oil and water phase components of the HIPE and have sufficient mechanical stability at the curing temperature so as to be effective.

At least a portion of the chamber 340 is heated in order to bring the HIPE to the intended curing temperature (or to maintain the HIPE at its temperature if it was formed at the desired curing temperature) as it passes through this section or zone. Any manner of heating this section or zone may be employed in order to reach and maintain the desired temperature in a controlled fashion. Examples include heating by resistive electrical elements, steam, hot oil or other fluids, hot air or other gases, open flame, or any other method of heating known to those skilled in the art. Optionally, a static mixer/heat exchanger or other forced convection heat exchanger can be utilized in the heated section to improve heat transfer into the HIPE. Once the HIPE begins to gel, the composition can no longer be mixed because of the risk of damaging or even destroying the structure of the foam.

The length of the optional heated section, the temperature of the optional heated section and the rate at which the emulsion is pumped through the tube are selected to allow for sufficient residence time within the chamber 340 for adequate heat transfer to the center of the chamber 340 in order to attain complete cure. If the optional heating is done in chambers 340, then Chambers 340 with relatively thin cross-sectional dimensions are preferred in order to facilitate rapid heat transfer. The HIPE is substantially cured into a HIPE foam by the time it exits the curing chamber 340. Optionally, an elevated extension 350 may be located above and downstream of the curing chamber 340 so as to provide a hydrostatic head.

The curing chamber 340 can have any desired cross section that is consistent with the flow requirements of pumping the curing HIPE. For example, the cross section can be rectangular, circular, triangular, annular, oval, hourglass, dog bone, asymmetric, etc., as may be desired for a particular use of the cured HIPE. Preferably, the cross sectional dimensions of the chamber 340 are such that the polymerized HIPE foam is produced in sheet-like form with the desired cross-sectional dimensions. Alternatively, the cross-sectional shape can be designed to facilitate manufacture of the desired product in subsequent processes. For example, an hourglass-shaped cross-section (or conjoined hourglass sections) of the appropriate size may facilitate making disposable absorbent products such as diapers by cutting relatively thin slices or sheets of the shaped HIPE foam. Other sizes and shapes may be prepared for making feminine hygiene pads, surgical drapes, face masks, and the like. Regardless of the cross-sectional dimensions of the curing chamber 340, the resultant HIPE foam may be cut or sliced into a sheet-like form with thickness suitable for the intended application.

The cross-section of the curing chamber 340 may be varied along the length of the chamber in order to increase or decrease the pressure required to pump the HIPE through the chamber. For example, the cross-sectional area of a vertical curing chamber may be increased above the point at which the HIPE foam is cured, in order to reduce the resistance to flow caused by friction between the walls of the chamber and the cured foam.

A solution of initiator and/or potentiator can optionally be injected into the HIPE at a point between the mixhead 330 and the curing chamber 340 (not shown). If the optional injection of initiator is chosen, the aqueous phase, as provided from the aqueous phase supply vessel, is substantially initiator free. Additional mixing means, such as a continuous mixer (not shown) may also be desirable downstream of the injection point and upstream of the curing chamber 340 to ensure the initiator solution is distributed throughout the HIPE. Such an arrangement has the advantage of substantially reducing the risk of undesirable curing in the mixhead 330 in the event of an unanticipated equipment shutdown.

A porous, water-filled, open-celled HIPE foam is the product obtained after curing in the reaction chamber. As noted above, the cross sectional dimensions of the chamber 340 are preferably such that the polymerized HIPE foam is produced in sheet-like form with the desired cross-sectional dimensions. Alternative cross-sectional dimensions may be employed, but regardless of the shape of the curing chamber 340, the resultant HIPE foam may be cut or sliced into a sheet-like form with thickness suitable for the intended application.

Sheets of cured HIPE foam are easier to process during subsequent treating/washing and dewatering steps, as well as to prepare the HIPE foam for use in the intended application. Alternatively, the product HIPE foam may be cut, ground or otherwise comminuted into particles, cubes, rods, spheres, plates, strands, fibers, or other desired shapes. If the product HIPE foam is to be shaped in this fashion, it often is useful to form it in a very thick section, e.g., up to several feet thick, in a rectilinear shape often termed a "billet". This increases the process throughput.

The aqueous phase remaining with the HIPE is typically substantially removed by compressing the foam. Remaining moisture can be removed as desired by conventional evaporative drying techniques or by freeze drying, solvent exchange, or any other method that reduces the water level to the desired amount.

III. Test Methods

The test methodologies for measuring Tg, yield stress, expansion factors, and stability in the compressed state are disclosed in U.S. Pat. No. 5,753,359.

Swelling Ratio: Swelling ratio may be used as a relative measure of the degree of crosslinking of the polymer comprising the HIPE foam. The degree of crosslinking is the critical part of curing as defined herein above. Swelling ratio is determined by cutting a cylindrical sample of the foam 2–6 mm thick, 2.5 cm in diameter. The foam sample is thoroughly washed with water and 2-propanol to remove any residual salts and/or emulsifier. This is be accomplished by placing the sample on a piece of filter paper in a Büchner funnel attached to a filter flask. A vacuum is applied to the filter flask by means of a laboratory aspirator and the sample is thoroughly washed with distilled water and then with 2-propanol such that the water and 2-propanol are drawn through the porous foam by the vacuum. The washed foam sample is then dried in an oven at 65° C. for three hours, removed from the oven, and allowed to cool to room temperature prior to measurement of the swelling ratio. The sample is weighed to within ±1 mg, to obtain the dry weight of the sample, Wd. The sample is then placed in a vacuum flask containing sufficient methanol to completely submerge the foam sample. Remaining air bubbles in the foam structure are removed by gentle reduction of the pressure in the flask by means of a laboratory aspirator. Gentle vacuum is applied and released several times until no more bubbles are observed leaving the foam sample when the vacuum is applied, and the foam sample sinks upon release of the vacuum. The completely saturated foam sample is gently removed from the flask and weighed to within ±1 mg, taking care not to squeeze any of the methanol out of the sample during the weighing process. After the weight of the methanol saturated sample is recorded, (Wm), the sample is again dried by gently expressing most of the methanol followed by oven drying at 65° C. for 1 hour. The dry sample is then placed into a vacuum flask containing sufficient toluene to completely submerge the foam sample. Residual air trapped within the pores of the foam is removed by gentle application and release of vacuum, as described above. The toluene saturated weight of the sample, Wt, is also obtained as described above. The swelling ratio may be calculated from the densities of methanol and toluene, and the weights recorded in the above procedure as follows:

$$\text{Swelling Ratio} = [(Wt-Wd)/(Wm-Wd)] \times 0.912$$

where 0.912 is the ratio of the densities of methanol and toluene.

Yield Stress: Yield stress is the most practical measure of the degree of curing and relates to the compression strength of the HIPE foam. Yield stress is the stress at which a marked change in the slope of the stress-strain curve occurs. This is practically determined by the intersection of extrapolated regions of the stress-strain curve above and below the yield point, as described in more detail below. The general test method for measuring yield stress is disclosed in U.S. Pat. No. 5,753,359. Specifically, for the purposes of this application, the following method is used:

Apparatus: Rheometrics RSA-2 or RSA-3 DMA, as is available from Rheometrics Inc., of Piscataway, N.J.

Setup: 0.1% strain rate per second for 600 seconds (to 60% strain) using 2.5 cm diameter parallel plates in compression mode; 31° C. oven temperature held for 10 minutes prior to the start of the test, and throughout the test.

Sample: HIPE foam samples cut into cylinders 2–6 mm thick and 2.5 cm in diameter. (Samples are expanded by washing in water as necessary. Water washing to remove any residual salts is the common practice as these can influence the results. Solvent extraction of the residual emulsifier can also be practiced though the results will show stronger foams in general.)

The resulting stress-strain curve can be analyzed by line fitting the initial linear elastic and plateau portions of the plot using a linear regression method. The intersection of the two lines thus obtained provides the yield stress (and yield strain).

Density: Foam density can be measured on dry, expanded foams using any reasonable method. The method used herein is disclosed in the aforementioned U.S. Pat. No. 5,387,207.

V. Specific Examples

These nonlimiting examples illustrate the preparation of HIPE foams according the present invention. Many options for variation will be recognized by those skilled in the art so as to produce HIPE foams with specific properties (such as Tg, density, durability, absorbent capacity, compressive strength, etc.) as required by the end application.

EXAMPLE 1

Small Scale Batch Preparation of a HIPE Foam

A) Emulsifier Preparation

The emulsifier used to stabilize the HIPE in this example is prepared as follows. Hexadecyl glycidyl ether (Aldrich of Milwaukee, Wis., 53201, 386 9) and isostearyl glycidyl ether (RSA Corp. of Danbury, Conn., 06810, 514 g) is melted in a round bottomed flask equipped with an overhead stirrer. The flask is blanketed with dry nitrogen during the melting. To the stirring melt is added a mixture of glycerol (Aldrich, 303 g) and N,N,N',N'-tetramethyl-1-6-hexanediamine (Aldrich, 22.7 g). The mixture is then heated to 135° C. using an oil bath for 3 hours. The temperature is then reduced to and held at 95° C. overnight. The resulting product is termed IDE/HDE and is used without further purification. [If only the isostearyl starting material is employed, then obviously the emulsifier is termed simply "IDE".]

B) HIPE Preparation

The aqueous phase used to form the HIPE is preparing by dissolving anhydrous calcium chloride (30.0 g) and sodium persulfate (0.30 g) in 300 mL of water. The oil phase is prepared by mixing 2-ethylhexylacrylate (EHA) (14 g), purified 1,6-hexanediol diacrylate (HDDA) (6.0 g), and HDE/IDE emulsifier (1.0 g). (Purification is effected by swirling the monomers (prior to addition of emulsifier) with an 10% w/w of basic aluminum oxide and filtering off the solids for use. This removes a significant portion of the alcohol impurity and the inhibitors.) These monomers may be obtained from Aldrich Chemical Co., Milwaukee, Wis. This provides the oil phase to be used in forming the HIPE. The monomer percentages by weight are 70% EHA and 30% HDDA.

The oil phase (7.0 g) is weighed into a high-density polyethylene cup with vertical sides and a flat bottom. The internal diameter of the cup is 70 mm and the height of the cup is 120 mm (these dimensions being primarily for convenience). The oil phase is stirred using an overhead stirrer equipped with a stainless steel impeller attached to the bottom of a stainless steel shaft ⅜ inch (9.5 mm) in diameter. The impeller has 6 arms extending radially from a central hub, each arm with a square cross section 3.5 mm×3.5 mm, and a length of 27 mm measured from the shaft to the tip of the arm. The oil phase is stirred with the impeller rotating at 250 to 300 rpm while 210.0 mL of pre-heated aqueous phase at 80° C. is added drop-wise over a period of ca. 3–4 minutes to form a high internal phase emulsion. (Essentially any other suitable relatively low shear mixing device or system may be employed.) The impeller is raised and lowered within the emulsion during the addition of the aqueous phase so as to achieve uniform mixing of the components. The ratio of the aqueous phase (210 mL) to the oil phase (7.0 g) is 30:1 in this experiment. (This is the W:O ratio.) The temperature of the HIPE just after formation is 70° C.

C) Polymerization/Curing of HIPE

The cup containing the HIPE is placed in an oven set at 85° C. for a period of 5 minutes. Upon removal from the oven, the container is immediately submerged in bath containing a mixture of ice and water in order to cool the vessel and its contents rapidly. After several minutes, the vessel is removed from the ice/water bath and the cured foam within is removed carefully for washing, dewatering, and characterization, as described in the Test Methods section above.

D) Foam Washing and Dewatering

The cured HIPE foam is removed from the container. The foam at this point has residual water phase (containing dissolved or suspended emulsifiers, electrolyte, initiator residues, and initiator) about 30 times the weight of polymerized monomers. The foam is dewatered by placing the sample on a piece of filter paper in a Büchner funnel attached to a filter flask. A vacuum is applied to the filter flask by means of a laboratory aspirator and the sample is thoroughly washed with distilled water and then with 2-propanol such that the water and 2-propanol are drawn through the porous foam by the vacuum. The washed foam sample is then dried in an oven at 65° C. for three hours, removed from the oven, and allowed to cool to room temperature prior to characterization as described in the Test Methods section above.

This general process has been repeated using variation in monomer formulation, curing temperatures, initiator/potentiator types, W:O ratios, emulsifier type and level, and the like. Representative data are shown in Table 1

| Condition | % EHA | % D4MA | % TMPTA | % EHMA | % TD3MA | % IDMA | % MMA | % STY | W:O Ratio | Tg (° C.) |
|---|---|---|---|---|---|---|---|---|---|---|
| A | 70 | | 30 | | | | | | 23 | 22° |
| B | 70 | 30 | | | | | | | 30 | −6° |
| C | 60 | 30 | | | | | 10 | | 31 | '8° |
| D | | 30 | | 70 | | | | | 38 | 46° |
| E | | | | 70 | 30 | | | | 33 | 37° |
| F | | | | | 30 | 70 | | | 31 | 23° |
| G | 25 | 5 | 7 | 10 | 5 | 22 | 27 | | 34 | |
| H | 25 | 5 | 7 | 10 | 4 | 22 | 26 | 1 | 44 | |

*EHA = 2-ethylhexyl acrylate; D4MA = 1,12-dodecanedioldimethacrylate; TMPTA - trimethylolpropanetriacrylate; TD3MA = 1,14-tetradecanedioldimethacrylate; IDMA = isodecylmethacrylate; MMA = methylmethacrylate; STY = styrene. Each oil phase further contains 5% by weight of that phase DGMO emulsifier.

These samples were formed to the W:O ratio wherein some difficulty in maintaining the emulsion was noted (e.g., the additional water was incorporated with difficulty). This provides some information relating to the emulsifiability of each composition. The acrylate monomers in each example were swirled over basic aluminum oxide (30% by weight of monomer phase) and filtered off prior to use. Example H was separately pushed to a W:O ratio of 60:1. These are non-limiting examples of the rapidly curing compositions of the present invention. Example H has a small amount of styrenic component which significantly enhanced the emulsion stability of that composition without significantly decreasing the rate of curing.

EXAMPLE 2

Comparative Kinetics of Curing of Representative HIPEs

The technique described in Example 1 is repeated with oil phase compositions as shown in Table 2 infra. In this experiment, the cups containing the HIPE are examined periodically (every few minutes) to determine if the sample has apparently cured, e.g., transitioned from flowable HIPE to non-flowable foam. This is effected by taking a small sample using a spatula and placing it in toluene. If the sample remains substantially uncured, the sample will break and dissolve substantially in the toluene. If the sample has cured, it swell in the toluene but remain substantially intact. The transition between the two is relatively sudden. The interval required for the sample to reach a given state of cure is recorded, as shown in Table 2. (The foam may not be fully cured at that point but is qualitatively judged to have reached approximately the same state of cure.) This measurement is made at varying temperatures as noted wherein the HIPE prepared and cured at the temperature cited.

methyl sulfate (DTDMAMS, 24.0 g). This gives a ratio of monomers of 40:40:20 of EHA:EHMA:EGDMA, respectively.

Separate streams of the oil phase (25° C.) and aqueous phase "C" (95° C.) are fed to a system of static mixers as described in PCT Application WO 01/27165 "Apparatus and Process for in-line preparation of HIPEs" published Apr. 19, 2001 in the name of Catalfamo et al. The configuration of the static mixers in terms of their design, diameter, and length may be varied to obtain different shear levels as desired so as to obtain different cell sizes in the resulting HIPE foam. Exemplary static mixer designs are a 1" diameter static mixer 24" in length and having 12 static mixer elements contained therein followed by a 1" diameter static mixer 12" in length having 6 static mixer elements therein for an overall emulsion flow rate of 2 L/min. The relative flow rates of the aqueous phase "C" and oil phase are adjusted to provide a ratio of 27:1. Just after the HIPE is formed, injection of aqueous phase "D" is effected into the HIPE stream with a subsequent 12" static mixer having 6 elements inserted prior to the exit port. The flow rate of aqueous phase "D" is adjusted so as to bring the W:O ratio up to 30:1. The exiting HIPE is a white flowable emulsion with viscosity reflecting the degree of shear imparted during formation. (For the present example, any means used to effect emulsification of the components is viable as cell size and microstructure are not critical elements for the purpose of this example.)

B) Polymerization/Curing of HIPE

Once the HIPE formation is judged stable, all or a portion of the emulsion flowing from the static mixer may be diverted in any of several ways depending on what is desired for subsequent curing of the HIPE. Among the options are collecting the HIPE in containers, including shaped molds, shaping it into a rectilinear sheet of specific thickness on a moving belt so as to form a continuous sheet, inserting it

TABLE 2

Approximate Time to Cure of Various HIPE Monomer Formulations.

| Condition | % EHA | % DVB42 | % HDDA | % STY | % EHMA | % HDMA | Minutes to "Cure" | Cure Temperature (° C.) |
|---|---|---|---|---|---|---|---|---|
| A* | 55% | 33% | 12% | | | | >122 | 22° C. |
| B* | 55% | 33% | 12% | | | | 50 | 50° C. |
| C* | | 30% | | 70% | | | >200 | 22° C. |
| D* | | 30% | | 70% | | | >200 | 50° C. |
| E | 70% | | 30% | | | | 22 | 22° C. |
| F | 70% | | 30% | | | | 6 | 50° C. |
| G | | | | | 70% | 30% | 38 | 22° C. |
| H | | | | | 70% | 30% | 16 | 50° C. |

*Comparative Examples A-D contain substantial amounts of styrenic comonomers and are appreciably slower in curing relative to the compositions of the present invention. These cured after the interval cited and before 1200 minutes had elapsed.
**HDMA = 1,6-hexanedioldimethacrylate. "STY" = styrene. "DVB42" is divinyl benzene of 42% purity with the remainder being primarily ethyl styrene, both being mixtures of the meta and para isomers primarily.

EXAMPLE 3

Continuous Preparation of Foam from a HIPE

A) HIPE Preparation

Aqueous phase "C" is prepared in volumes of 600 L containing 24 kg calcium chloride. Aqueous phase "D" is prepared in volumes of 60 L containing and 600 g sodium persulfate. The oil phase is prepared by mixing 2-ethylhexyl acrylate (EHA, 7550 g), 2-ethylhexylmethacrylate (EHMA, 7550 g), and ethylene glycol dimethacrylate (EGDMA, 3770 g), IDE emulsifier (940 g), and ditallowdimethyl ammonium between two moving sheets of specific thickness, pumping it though a cylindrical vessel or chamber such as a pipe, and pumping it vertically into a chamber with any of several cross-sectional dimensions. Generally, these takeaway elements will serve to shape the HIPE into the final desired shape (or one which can be readily converted into that shape) while also providing the heat needed to effect curing in a reasonable period of time. Often, the heat supplied is to maintain the temperature of the HIPE at that at which it was originally formed. These takeaway elements will have an exit from which substantially cured HIPE foam in specific shape will emanate. For example, a HIPE stream may be dispensed onto a moving belt which passes through a curing oven set at 95° C. for a period of about 3 minutes. The exiting cured HIPE foam would be a continuous sheet formed typically to a thickness of between about 1 mm and about 10 mm and having a width of up to several meters.

C) Foam Washing and Dewatering

The cured HIPE foam exiting the curing has residual aqueous phase (containing dissolved or suspended emulsifiers, electrolyte, initiator residues, and initiator) about 30 times (30x) the weight of polymerized monomers. Typically, the aqueous phase is removed by applying compression to squeeze out most of the aqueous phase, for example, by passing a HIPE foam sheet through a series of dual porous nip rolls equipped with vacuum to gradually reduce the residual water phase content of the foam to about 6 times (6x) the weight of the polymerized material. At any point, the sheet may then resaturated aqueous solution containing any desired water soluble adjuvants, and squeezed in a series of 3 porous nip rolls equipped with vacuum to a water phase content of about 4x.

If the shear applied during emulsification is sufficient, the foam will remain compressed after the final nip at a thickness of about 0.021 in. (0.053 cm). The foam is then dried in air for about 16 hours. The foam sheet may also be dried using any method of heating such as exposure to forced heated air streams. Such drying reduces the moisture content to about 9–17 % by weight of polymerized material. At this point, the foam sheets are very drapeable. The foam also contains about 5% by weight of residual emulsifier. When expanded in water, its free absorbent capacity is about 30 mL/g and has a glass transition temperature of about 23° C.

While various embodiments and/or individual features of the present invention have been illustrated and described, it would be obvious to those skilled in the art that various other changes and modifications can be made without departing from the spirit and scope of the invention. As will be also be apparent to the skilled practitioner, all combinations of the embodiments and features taught in the foregoing disclosure are possible and can result in preferred executions of the invention. It is therefore intended to cover in the appended claims all such changes and modifications that are within the scope of this invention.

EXAMPLE 4

Multiple Layer HIPE Foam Formation

This variation on the process of Example 3 supra provides continuous HIPE foams having discontinuous types of HIPE foams joined in a composite structure. Such "heterogeneous" foams are disclosed generally in U.S. Pat. No. 5,817,704 (Shiveley et al.) issued Oct. 6, 1998. Specifically, two HIPE streams such as the one described in Example 3 are provided wherein the HIPE streams differ in some critical parameter such as W:O ratio, monomer formulation, initiator type, rate of flow, geometry of formation (infra), amount of shear imparted, and the like. In one embodiment, the two HIPE streams are provided to a moving belt juxtaposed one on top of the other and wherein the upper HIPE is formed with minimal shear and the lower formed with significantly more shear. Further, the upper HIPE is produced at a flow rate about a fifth that of the lower stream but both are shaped into substantially rectilinear sheets. It can be preferred that no final injection of aqueous solution of initiator be applied to this upper flow, thereby relying on the initiator in the lower HIPE to effect polymerization and curing. The resulting composite structure is that of two sheets, the lower one being thicker, both of equal widths, joined together by some mixing at the interface of the two emulsions. Such a composite sheet can be particularly preferred in absorbent articles as the primary absorbent element as the upper layer will have larger cells and acquire fluid more rapidly, thus handling gushes of fluid which occur often in absorbent article use. The thicker lower HIPE foam generated with more shear can further be designed to have "thin-after-drying" properties and smaller cells, both contributing to a significant excess of capillary dewatering ability so that the fluid initially absorbed by the upper layer of the composite will substantially migrate by capillary differential pressure even against the force of gravity substantially into this lower layer, thus drying the upper layer which is contemplated as being closer to the surface or skin of the wearer, in cases wherein the absorbent article is of the type worn by person or animal. This confers surface drying which is highly desirable while storing the absorbed fluid away from the wearer and further wicking the fluid as needed even against the force of gravity. The particular advantage of the use of the fast curing chemistries for such application is that intermixing of the two different emulsions has comparatively little time to take place so that the interface remains more distinct as are the properties of the two layers.

In the case of an absorbent article such as a tampon, it may be desired to "extrude" the HIPE in a concentric cylinders wherein the higher shear HIPE is extruded as the inner concentric cylinder surrounded by the lesser sheared HIPE in the outer concentric cylinder. Once cured and after exiting from the cylindrical curing chamber, these may be cut to length and converted into the finished tampon shape.

It will be obvious to those skilled in the art that the two—or three or more—different HIPEs formed and joined just prior to curing may differ in many attributes beyond just shear rate and each stream may be formed into myriad shapes and geometries within or laying on the other(s) prior to curing.

EXAMPLE 5

Variation on Formulations for Different Properties

The process of Example 1 was followed and the oil phase components and associated component flow rates were varied to evaluate the effect on the properties of interest in these exemplary foams of the present invention, as shown in Table 3.

TABLE 3

Monomer Formulations and Resultant Properties of Interest.

| Condition | % EHA | % EHMA | % EGDMA | % HDDA | % STY | W:O Ratio | Yield Stress (psi) | Tg (° C.) | Approoximate Curing Time of the 95° C. HIPE (min) |
|---|---|---|---|---|---|---|---|---|---|
| A | 58.5 | 6.5 | 33 | 2 | 0 | 40:1 | 1.55 | 25° | 3 |
| B | 40 | 41 | 19 | 0 | 0 | 25:1 | 2.00 | 2° | 3 |

TABLE 3-continued

Monomer Formulations and Resultant Properties of Interest.

| Condition | % EHA | % EHMA | % EGDMA | % HDDA | % STY | W:O Ratio | Yield Stress (psi) | Tg (° C.) | Approximate Curing Time of the 95° C. HIPE (min) |
|---|---|---|---|---|---|---|---|---|---|
| C | 39 | 40 | 21 | 0 | 0 | 25:1 | 1.70 | 25° | 3 |
| D | 35 | 49 | 16 | 0 | 0 | 25:1 | 1.36 | 17° | 3 |
| E | 33 | 53 | 14 | 0 | 0 | 25:1 | 0.76 | 14° | 3 |
| F | 26 | 60 | 14 | 0 | 0 | 25:1 | 1.15 | 2° | 3 |
| G | 68 | 0 | 22 | 0 | 10 | 25:1 | 1.68 | 25° | 5 |
| H | 66 | 0 | 24 | 0 | 10 | 25:1 | 1.32 | 22° | 5 |
| I | 72 | 4 | 4 | 20 | 0 | 25:1 | 0.98 | 6° | 3 |
| J | 38 | 38 | 20 | 4 | 0 | 25:1 | 2.71 | 22° | 3 |
| K | 68 | 0 | 22 | 0 | 10 | 30:1 | — | 25° | 5 |
| L | 70 | 0 | 25 | 0 | 5 | 35:1 | — | 27° | 5 |
| M* | 58.3 | 0 | 18.7 DVB55 | 0 | 23 | 25:1 | 1.00 | 2° | 20 |
| N* | 55 | 0 | 33.0 DVB55 | 12 | 0 | 45:1 | 1.6 | 22° | 10 |

*Examples M and N are comparative and not within the scope of the present invention since the styrenic components (DVB55, which is DVB of 55% purity obtained from Dow Chemical of Midland, MI plus styrene) exceed the allowable limit of about 15% of the formulations of the present invention, with significant lengthening of the cure time.

Examples 4 A-L are exemplary of the compositions of the present invention. Many other variations have been tried using different alkyl acrylates and alkyl methacrylates as comonomers and different di- and tri- acrylates and methacrylates as crosslinking monomers. Examples of such comonomers and alternate crosslinkers are cited in the disclosure of the present invention supra. Further variation in items such as W:O ratio, emulsifier type, and shear imparted to the emulsion are variables of particular consequence.

EXAMPLE 6

Formulations Containing Mixed Crosslinkers

Mixed crosslinkers are those which contain different reactive functional groups. Nonlimiting examples include ethylene glycol acrylate methacrylate (EGAM), 1,6-hexanediol acrylate methacrylate (HDAM), neopentyl glycol acrylate methacrylate (NGAM), and related polyfunctional compounds. The ratio of acrylate:methacrylate moieties on the crosslinker can be varied between 100:0 and 0:100 but will usually range from about 30:70 to about 70:30. For the purposes of exemplification, in some of the examples shown the ratio is controlled to be 50:50 by taking the monofunctional acrylate (or methacrylate) alcohol (e.g., 2-hydroxyethyl acrylate) and esterifying with methacrylic acid (or acrylic acid). The process of Example 1 was followed and only the oil phase components varied to evaluate the effect on the properties of interest in these exemplary foams of the present invention, as shown in Table 4.

TABLE 4

Monomer Formulations using Mixed Crosslinkers and Properties of Interest.

| Condition | % EHA | % EHMA | % EGDMA | % EGAM | % NPDMA | % NGAM | W:O Ratio | Density (mg/cc) | Yield Stress (psi) | Tg (° C.) |
|---|---|---|---|---|---|---|---|---|---|---|
| A | 765 | | 12.1 | | | 11.4 | 30 | 33 | 0.57 | 9° |
| B | 76.5 | | 12.1 | | 11.4 | | 30 | 33 | 0.72 | 22° |
| C | 76.4 | | 12.1 | 11.5 | | | 30 | 32 | 0.71 | −1° |
| D | 76.4 | | 23.6 | | | | 30 | 34 | 0.87 | 15° |
| E | 46.0 | 34.0 | | 20.0 | | | 31 | 33 | 0.32 | 1° |
| F | 65.0 | 15.0 | 20.0 | | | | 31 | 32 | 0.46 | 0° |
| G | 46.0 | 34.0 | | | 20.0 | | 25 | 38 | 0.46 | 9° |
| H | 65.0 | 15.0 | 29.0 | | | | 25 | 41 | 1.02 | 6° |

*EGDMA and NPDMA are the "normal" symmetric crosslinkers. EGAM and NGAM are the unsymmetric crosslinkers. EGAM is 93% EGAM and 7% EGDMA. NGAM is 23% NPDA, 53% NPAM, and 24% NPDMA. Examples 6 A-H are all within the scope of the present invention.

The disclosures of all patents, patent applications (and any patents which issue thereon, as well as any corresponding published foreign patent applications), and publications mentioned throughout this description are hereby incorporated by reference. It is expressly not admitted, however, that any of the documents incorporated by reference herein teach or disclose the present invention.

What is claimed is:

1. A process for the preparation of a polymeric foam material which comprises the steps of:
   A) forming a water-in-oil emulsion from:
      1) an oil phase comprising:
         a) from about 80 to about 99% by weight of a monomer component capable of rapid curing, the monomer component comprising:
            i) from about 20 to about 97% by weight of a substantially water-insoluble monomer selected from the group consisting of alkyl acrylates, alkyl methacrylates, and mixtures thereof;

ii) from about 2 to about 40% by weight of a substantially water-insoluble polyfunctional crosslinker selected from the group consisting of acrylate polyester, methacrylate polyester, and mixtures thereof;

iii) about 0 to about 15% by weight of a third substantially water-insoluble monomer; and b) from about 1 to about 20% by weight of an emulsifier component which is soluble in the oil phase and suitable for forming a stable water-in-oil emulsion; and 2) a water phase comprising an aqueous solution containing from about 0.2 to about 40% by weight of a water-soluble electrolyte;

wherein the emulsion has a volume to weight ratio of water phase to oil phase in the range of from about 8:1 to about 140:1;

B) curing the monomer component in the oil phase of the water-in-oil emulsion using a polymerization reaction that is conducted at a curing temperature of from about 20° C. to about 130° C. for a time sufficient to form a saturated polymeric foam material.

2. The process of claim 1 wherein the curing time is less than about 5 minutes at a curing temperature of from about 70° C. to about 110° C.

3. The process of claim 1 comprising the further step of dewatering the polymeric foam material to an extent such that a collapsed, polymeric foam material is formed that will re-expand upon contact with aqueous fluids.

4. The process of claim 3 wherein the volume to weight ratio of water phase to oil phase is in the range of from about 12:1 to about 65:1.

5. The process of claim 4 wherein the volume to weight ratio of water phase to oil phase is in the range of from about 18:1 to about 45:1.

6. The process of claim 1 wherein the monomer component comprises:

i) from about 20 to about 97% by weight of an acrylate monomer selected from the group consisting of $C_4$–$C_{18}$ alkyl acrylates, aryl acrylates, $C_2$–$C_{18}$ alkyl methacrylates, and mixtures thereof;

ii) from about 2 to about 40% by weight of a crosslinking comonomer selected from the group consisting of polyfunctional acrylate and methacrylate esters; and the emulsifier component is from about 3 to about 10% by weight; and the water phase additionally comprises from about 1 to about 40% of an inorganic water soluble salt.

7. The process of claim 6 wherein monomer of part (i) is selected from the group consisting of butyl acrylate, hexyl acrylate, octyl acrylate, 2-ethylhexyl acrylate, nonyl acrylate, decyl acrylate, dodecyl acrylate, isodecyl acrylate, tetradecyl acrylate, benzyl acrylate, nonylphenyl acrylate, hexyl methacrylate, octyl methacrylate, nonyl methacrylate, decyl methacrylate, isodecyl methacrylate, dodecyl methacrylate, tetradecyl methacrylate, and mixtures thereof.

8. The process of claim 6 wherein crosslinking comonomer of part (ii) is selected from the group consisting of 1,6-hexanedioldiacrylate, 1,4-butanediolacrylate, 1,4-butanedioldimethacrylate, trimethylolpropane triacrylate, trimethylolpropane trimethacrylate, 1,12-dodecanedioldimethacrylate, ethylene glycol dimethacrylate, ethylene glycol diacrylate, neopentyl glycol dimethacrylate, glucose pentaacrylate, sorbitan pentaacrylate, ethylene glycol acrylate methacrylate, hexanediol acrylate methacrylate, and neopentyl glycol acrylate methacrylate.

9. The process of claim 6 wherein the monomer of part (iii) is selected from the group consisting of vinyl chloride, vinylidene chloride, styrene, divinyl benzene, ethyl styrene, and chlorostyrene.

10. The process of claim 1 wherein the emulsifier is selected from the group consisting of isodecyl glycidyl ether, polyglycerol succinate, ditallow dimethyl ammonium methyl sulfate, and mixtures thereof.

11. The process of claim 1 wherein a polymerization initiator selected from the group consisting of ammonium persulfate, sodium persulfate, and potassium persulfate is injected as an aqueous solution substantially after initial formation of the HIPE.

12. The process of claim 1 wherein the aqueous phase contains hydrosulfite.

13. The process of claim 1 wherein a second aqueous phase containing hydrosulfite is injected immediately after formation of the high internal phase emulsion.

14. The process of claim 1 wherein crosslinking monomer of part (ii) includes trimethylolpropane trimethacrylate.

15. A process for the preparation of a polymeric foam material which comprises the steps of:

A) forming a water-in-oil emulsion from:

1) an oil phase comprising:

a) from about 80 to about 99% by weight of a monomer component capable of rapid curing, the monomer component comprising:

i) from about 45 to about 85% by weight of a substantially water-insoluble monomer selected from the group consisting of 2-ethylhexyl acrylate, 2-ethylhexyl methacrylate, and mixtures thereof;

ii) from about 10 to about 30% by weight of ethylene glycol dimethacrylate; and b) from about 1 to about 20% by weight of an emulsifier component selected from the group consisting of of isodecyl glycidyl ether, polyglycerol succinate, ditallow dimethyl ammonium methyl sulfate, and mixtures thereof; and 2) a water phase comprising an aqueous solution containing from about 2 to about 20% by weight of calcium chloride and an initiator;

wherein the emulsion has a volume to weight ratio of water phase to oil phase in the range of from about 13:1 to about 65:1;

B) curing the monomer component in the oil phase of the water-in-oil emulsion using a polymerization reaction that is conducted at a curing temperature of from about 80° C. to about 110° C. for a time sufficient to form a saturated polymeric foam material.

* * * * *